United States Patent
Greenblatt et al.

(10) Patent No.: US 9,822,528 B1
(45) Date of Patent: Nov. 21, 2017

(54) BICYCLE SHELTER ASSEMBLY

(71) Applicant: Everlast Climbing Industries, Inc., Mendota Heights, MN (US)

(72) Inventors: Joel Greenblatt, Wauwatosa, WI (US); Andrew Patrick Kennedy Lageson, Minneapolis, MN (US)

(73) Assignee: EVERLAST CLIMBING INDUSTRIES, INC., Minneapolis, MN (US)

( * ) Notice: Subject to any disclaimer, the term of this patent is extended or adjusted under 35 U.S.C. 154(b) by 0 days.

(21) Appl. No.: 15/467,745

(22) Filed: Mar. 23, 2017

(51) Int. Cl.
| | |
|---|---|
| *E04B 7/16* | (2006.01) |
| *E04H 1/12* | (2006.01) |
| *E04B 7/02* | (2006.01) |
| *E04D 3/06* | (2006.01) |
| *B62H 3/04* | (2006.01) |
| *B62J 19/00* | (2006.01) |

(52) U.S. Cl.
CPC ............... *E04B 7/163* (2013.01); *B62H 3/04* (2013.01); *B62J 19/00* (2013.01); *E04B 7/022* (2013.01); *E04D 3/06* (2013.01); *E04H 1/1205* (2013.01); *B62H 2700/00* (2013.01)

(58) Field of Classification Search
CPC .......... E04B 7/163; E04B 7/022; B62J 19/00; B62H 3/04; B62H 2700/00; E04H 1/1205; E04D 3/06
See application file for complete search history.

(56) References Cited

U.S. PATENT DOCUMENTS

| | | | | |
|---|---|---|---|---|
| 2,701,397 A | * | 2/1955 | Taylor | E04F 10/08 52/4 |
| 2,896,651 A | * | 7/1959 | Hilligoss | E04B 7/163 126/299 R |
| 3,060,519 A | * | 10/1962 | Francis | B60J 11/00 135/90 |
| 3,222,829 A | * | 12/1965 | Bening | E04L 31/34326 52/282.2 |
| 4,527,355 A | * | 7/1985 | Numakami | E04B 7/163 49/275 |
| 5,078,442 A | * | 1/1992 | Rau | E04H 3/24 296/26.02 |

(Continued)

FOREIGN PATENT DOCUMENTS

| | | | | |
|---|---|---|---|---|
| DE | EP-3133223 A1 | * | 2/2017 | E04B 7/163 |
| ES | EP-2803778 A3 | * | 12/2014 | E04B 7/163 |

(Continued)

*Primary Examiner* — Jeanette E Chapman
(74) *Attorney, Agent, or Firm* — McAndrews, Held & Malloy, Ltd.

(57) ABSTRACT

Embodiments of the present invention are directed to shelter assemblies for bicycles that can be custom designed in a variety of configurations using a relatively small number of modular, easily assembled components. The shelter assembly comprises at least first and second uprights, a crossbar bridging the first and second uprights, and a plurality of roof panels secured to the crossbar. Each roof panel is constructed from a shielding element and one or more rafter elements, which allows each roof panel to be independently rotatable to a plurality of different angles. By securing the roof panels to the crossbar, and in some embodiments the uprights, in a desired configuration, one may prepare a shelter assembly that is custom designed for a particular installation location.

20 Claims, 10 Drawing Sheets

(56) References Cited

U.S. PATENT DOCUMENTS

| | | | | |
|---|---|---|---|---|
| 5,109,643 | A | * | 5/1992 | Speers .................... E04L 37/00 52/220.3 |
| 5,512,109 | A | * | 4/1996 | Fraas .................... H01L 31/054 136/253 |
| 5,546,709 | A | * | 8/1996 | Decker .................... E04H 3/28 296/26.07 |
| 5,550,349 | A | * | 8/1996 | Bomba .................. E04B 7/163 219/213 |
| 2004/0074157 | A1 | * | 4/2004 | Chazal ................ E04L 31/3416 52/66 |
| 2010/0171016 | A1 | * | 7/2010 | Haddock ................. E04D 13/10 248/237 |
| 2017/0145689 | A1 | * | 5/2017 | Ivic ......................... E04B 7/163 |

FOREIGN PATENT DOCUMENTS

| | | | | |
|---|---|---|---|---|
| FR | 2033508 | A5 | * | 12/1970 ............. E04B 7/163 |
| KR | 100959805 | B1 | * | 5/2010 ............... B62H 3/04 |

* cited by examiner

BICYCLE SHELTER ASSEMBLY

BACKGROUND OF THE INVENTION

Public bicycle racks and parking structures provide locations that are reserved for the parking of bicycles. Most of the time, however, the bicycle racks and parking structures offer little, if any, protection from the elements, such as rain, snow, and the like. Standalone shelter units exist for a variety of applications, but are generally difficult to assemble and have a fixed configuration, which offers no options for customization to fit a particular space.

SUMMARY OF THE INVENTION

Embodiments of the present disclosure are directed to a shelter assembly configured to provide protection for bicycle racks or other bicycle parking structures. The shelter comprises a first upright and a second upright spaced apart from one another by a distance sufficient to contain a bicycle rack or parking structure. The shelter also comprises a crossbar, which bridges between the first and second uprights. The bottom of each upright is secured to a ground surface. An upper end of each upright is attached to the crossbar. The shelter also comprises a plurality of roof panels, each of the roof panels extending from the crossbar so as to provide a protective cover against the elements.

Each roof panel comprises at least one rafter element and one shielding element. In some embodiments, for instance, each roof panel comprises a pair of rafter elements and one shielding element, which is desirably a sheet of glass.

Each rafter element comprises a body and a clamp. The body comprises an upper body portion and a lower body portion separated along a length of the body by a slot, the slot being configured to receive the shielding element. The shielding element is secured within the slots of the one or more rafter elements by a plurality of fasteners. In some embodiments, the slots of the one or more rafter elements may extend at least 50% of the length of the shielding element, such as for example about 66% of the length of the shielding element, in order to provide enhanced stability to the shielding element.

The clamp comprises a first portion and a second portion. The first portion is integral with the body. The second portion is attached to the first portion to form an aperture configured to accept the crossbar. Each roof panel is configured to be independently rotatable to a plurality of different angles by loosening one or more fasteners that attach the first portion and the second portion of the clamp. Each roof panel is also configured to be securable to the crossbar at a desired angle by tightening the one or more fasteners that attach the first portion and the second portion of the clamp.

The roof panels may be positioned to angle downward, such that rainwater runs off the distal end of the panels. Alternatively, the roof panels may be positioned to angle upward, such that rainwater runs off the proximal end of the panels. Alternatively, the roof panels may be positioned to be substantially horizontal. In some embodiments, some of the roof panels may be angled upward and others angled downward. For example, a plurality of roof panels extending from one side of the crossbar may comprise at least a first roof panel angled downward and a second roof panel angled upward. The specific angles of the roof panels may be selected to best fit a given space. In some embodiments, for instance, each of the plurality of roof panels may be positioned at an angle between about −20 degrees and about 20 degrees relative to a horizontal axis, alternatively between about −5 degrees and −15 degrees or between about 5 degrees and about 15 degrees.

In some embodiments, the roof panels may extend from only one side of the crossbar while in other embodiments, the roof panels may extend from two sides of the crossbar, i.e. in each of two opposing directions. In some embodiments, all of the roof panels may be angled downward or all of the roof panels may be angled upward. For example, the plurality of roof panels extending in each of two opposing directions may be positioned at substantially the same angle relative to horizontal. In other embodiments, the roof panels on one side may be angled downward and the roof panels on the other side may be angled upward. For example, the plurality of roof panels extending from one side may be position so as to have the opposite angle as the plurality of roof panels extending from the other side. The orientation of the roof panels is easily adjustable and thus may be selected based on site-specific conditions.

In some embodiments, the roof panels may also be configured to be secured to the first upright and the second upright, so as to provide additional protection against the elements. For example, one or more roof panels may be secured to the first upright, the second upright, or a combination thereof, depending on which direction the shelter may be most exposed to the elements. In some embodiments, for instance, one or more roof panels may be secured to the first upright and one or more roof panels may be secured to the second upright, with the roof panels secured to the first and second uprights extending in the same direction as at least some of the plurality of roof panels secured to the crossbar. In this embodiment, for example, the shelter may provide protective panels providing shelter for a bicycle rack or parking structure in three directions (above, first side, second side).

Some embodiments of the shelter assembly are configured to be modular. For instance, in some embodiments, each of the first and second uprights comprises a T-joint, each side of the T-joint being configured to attach to a crossbar. Thus, a single upright may be used to support two crossbars. When an upright is only used to support a single crossbar, the open side of the T-joint may be covered by an end cap. In some embodiments, for instance, the shelter assembly may comprise a third upright, a second crossbar bridging the second upright and the third upright, and a plurality of roof panels secured to the second crossbar.

In some embodiments, the shelter assembly may be configured for a first set of three roof panels to extend from a first side of the crossbar, the set of three roof panels being configured to span substantially the entire length of the crossbar between the two uprights. Where it is desired that roof panels extend in two opposing directions, the shelter assembly may also be configured for a second set of three roof panels to extend from a second side of the crossbar, the second set of roof panels also being configured to span substantially the entire length of the crossbar between the two uprights. In some embodiments, the first set of roof panels and the second set of roof panels may be configured to be substantially aligned (i.e. the edges of opposing panels are substantially aligned with one another).

Embodiments of the present disclosure are also directed to a shelter assembly as described herein, further comprising at least one bicycle parking structure or bicycle rack positioned underneath the plurality of roof panels.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Embodiments of the present disclosure are directed to a shelter assembly for providing bicycles protection against rain, snow, and the like. The shelter assemblies disclosed herein may also provide the added benefit of visibly designating the location of bicycle parking, even where the bicycle racks themselves may not be visible due to obstructions or long distances. Additionally, by providing a designated space surrounding a bicycle rack or parking structure, the shelter assemblies disclosed herein may help protect bicycles from being knocked over by passers-by.

Figure 1:
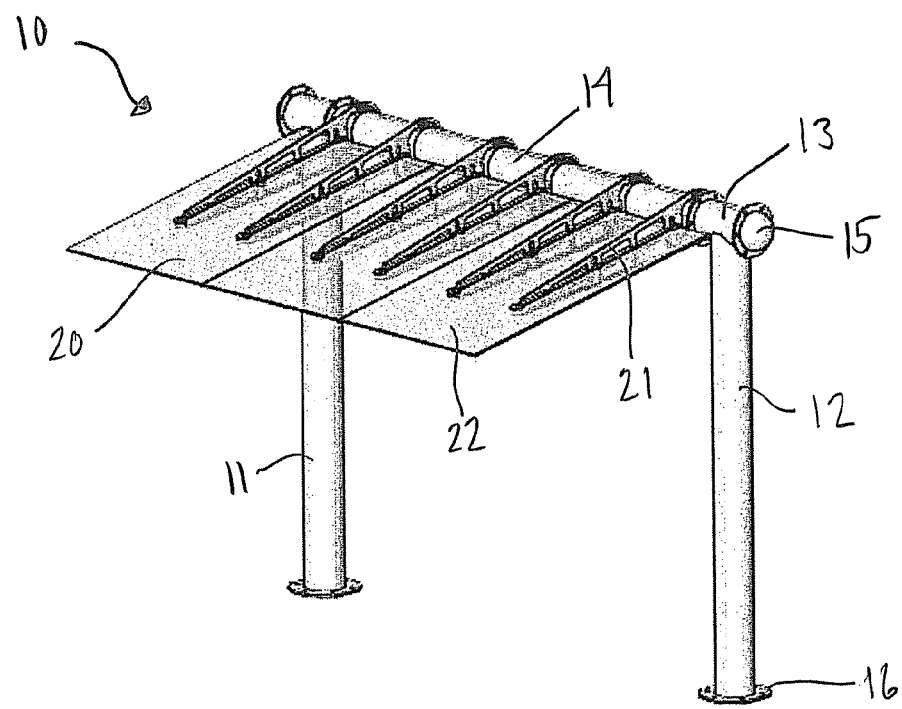
FIG. 1 is a front perspective view of an embodiment of a bicycle shelter assembly of the present disclosure.

An embodiment of the shelter assembly 10 disclosed herein is shown in FIG. 1. The shelter assembly comprises at least a first upright 11 and a second upright 12. The first and second uprights 11, 12 may be substantially identical, which enhances the modularity of the assembly 10. For instance, in some embodiments, the upper end of each upright 11, 12 may comprise a T-joint 13, each side of the T-joint being configured to attach to a crossbar 14. Thus, a single upright 11, 12 may be used to support two crossbars 14, one extending from each side of the T-joint 13. When an upright 11, 12 is only used to support a single crossbar 14, as shown in FIG. 1 for example, the unused side of the T-joint 13 may be covered by an end cap 15. The bottom end of each upright 11, 12 may comprise a mounting plate 16, which provides for a secure anchoring to the ground (such as through the use of concrete rod anchors). The uprights 11, 12 may be designed to have a desired height. In some embodiments, for example, each upright 11, 12 may have a height that is between about 10 feet and about 12 feet.

Crossbar 14 bridges between the first and second uprights 11, 12. For instance, a first end of the crossbar 14 may be attached to the first upright 11, e.g. at a side of its T-joint 13, and a second end of the crossbar may be attached to the second upright 12, e.g. at a side of its T-joint. Each end of the crossbar 14 may comprise a flange that is configured to align with a flange located on the side of the T-joint 13. This configuration provides for easy assembly using a plurality of fasteners, e.g. bolts or the like. The crossbar 14 may be designed to have a desired length. In some embodiments, each crossbar 14 may be substantially identical, which enhances the modularity of the assembly 10. For instance, in some embodiments, each of the crossbars 14 may be between about 9 feet and about 12 feet in length.

The uprights 11, 12 and the crossbar 14 may each comprise round steel tubes. In some embodiments, the uprights 12, 12 and the crossbar 14 may comprise round tubes having substantially the same diameter. The uprights 11, 12, the crossbar 14, or the combination thereof may also be galvanized for protection against rust.

The shelter assembly 10 also comprises a plurality of roof panels 20. The plurality of roof panels 20 extend from the crossbar 14 so as to provide a protective cover against the elements (e.g., rain, snow, wind) to bicycles parked below the plurality of panels. The plurality of roof panels 20 may extend a desired distance from the crossbar 14. For instance, in some embodiments, the plurality of roof panels 20 may extend between about 6 feet and about 8 feet from the crossbar. The number of roof panels 20 extending from the crossbar 14 in a single direction may vary depending on the desired size of the shelter assembly 10.

In some embodiments, each crossbar 14 may be sized to support a particular number of roof panels 20, such as to cover a desired bicycle rack or parking structure. For instance, in the embodiment shown in FIG. 1, the shelter assembly 10 may be configured for a set of three roof panels 20 to extend from the crossbar 14 in a single direction. The set of three roof panels 20 may be configured to span substantially the entire length of the crossbar 14 between the first and second uprights 11, 12. In fact, in the embodiment shown in FIG. 1, the set of three roof panels 20 actually extends slightly beyond the length of the crossbar 14, such that the side edges of the set of roof panels are substantially aligned with the central axes of the first and second uprights 11, 12. Such an arrangement has particular benefits when two assemblies are connected modularly in series, as described in detail herein.

Each roof panel 20 comprises at least one rafter element 21 and one shielding element 22. In the illustrated embodiments, for instance, each roof panel 20 comprises two rafter elements 21 for each shielding element 22. The use of two rafter elements 21 with each shielding element 22 provides enhanced stability and strength, without unnecessarily burdensome costs such as may be incurred by using larger shielding elements 22, additional rafter elements 21, or the like. Nevertheless, in some (non-illustrated) embodiments, each roof panel 20 may comprise one rafter element 21, three rafter elements, or more for each shielding element 22.

Figure 3:
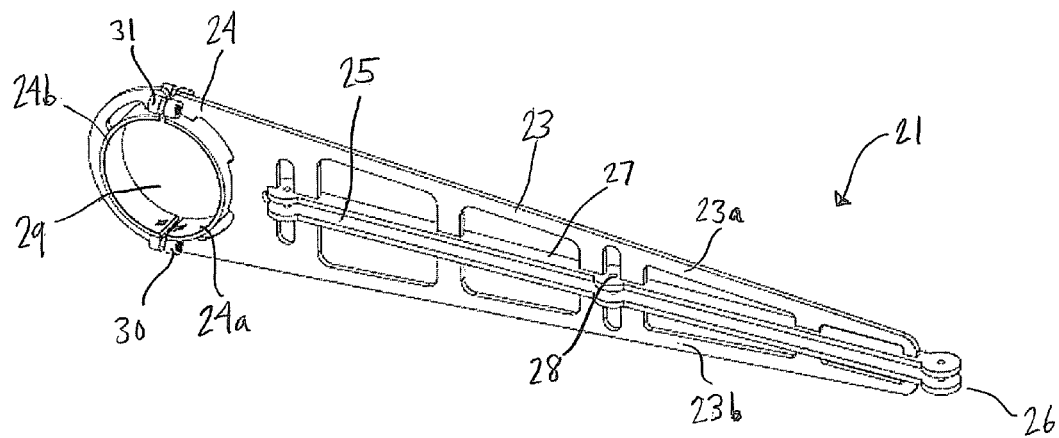
FIG. 3 is a perspective view of an embodiment of a rafter element of a roof panel.

An embodiment of a rafter element 21 is shown in FIG. 3. Each rafter element comprises a body 23 and a clamp 24. The body comprises an upper body portion 23*a* and a lower body portion 23*b*. The upper and lower body portions 23*a*, 23*b* are separated by a slot 25. The slot 25 is configured to receive the shielding element 22. The slot 25 runs along a desired length of the body 23, such as along at least 85% of length of the body, alternatively along at least 90% of the length of the body. As illustrated in FIG. 3, the slot 25 preferably extends to a tip of the body 26, which provides for the shielding element 22 to extend beyond the end of the rafter element 21. In alternative (non-illustrated) embodiments, the body may be configured to extend beyond the shielding element 22 and the slot 25 may be enclosed by a tip 26 of the body.

Directly adjacent the slot 25, the upper and lower body portions 23*a*, 23*b* may comprise a flange element 27. The flange element 27 provides for a stable and secure connection to be made between the rafter element 21 and the shielding element 22. For instance, the flange elements 27 may comprise a plurality of mounting holes 28. The mounting holes on the upper and lower flange elements 27 align with one another. Preferably, the flange elements 27 comprise a mounting hole 28 located at or near each end of the slot 25. Additional mounting holes 28 may be positioned along the length of the slot 25 for enhanced stability. In the embodiment illustrated in FIG. 3, for example, the flange elements 27 each comprise a series of three mounting holes 28. As also shown in the embodiment of FIG. 3, the upper and lower body portions 23*a*, 23*b* may comprise openings above (upper body portion 23*a*) and/or below (lower body portion 23*b*) each mounting hole 28 to provide easy access during assembly.

The clamp 24 comprises a first portion 24*a* and a second portion 24*b*. The first portion 24*a* may be integral with the body 23 or may be secured to the body. The second portion 24*b* is attachable to and removable from the first portion 24*a*. When the first and second clamp portions 24*a*, 24*b* are attached, the clamp comprises an aperture 29. The aperture 29 is sized and configured to surround the crossbar 14. The first and second clamp portions 24*a*, 24*b* are securable together by a plurality of fasteners. For instance, at least one of the first and second clamp portions 24*a*, 24*b* may comprise a plurality of threaded clamp nuts 30 that are configured to receive a threaded bolt member. In the illustrated embodiment, for example, the first clamp portion 24*a* comprises four threaded clamp nuts 30, two positioned above the aperture 29 and two positioned below the aperture. The second clamp portion 24*b* comprises a plurality of conduits 31 configured to align with the threaded clamp nuts 30 and receive the threaded bolt. The positioning of the clamp nuts 30 and conduits 31 on the first and second clamp portions 24*a*, 24*b* could be reversed, although the illustrated embodiment provides for an increased ease of assembly.

The shielding element 22 comprises a sheet material that is capable of withstanding the elements of rain, snow, wind, and the like. As shown in the illustrated embodiments, the shielding element 22 may desirably comprise a tempered glass sheet. The tempered glass sheet may be a laminated glass. In some embodiments, for example, the tempered glass sheet may comprise two glass layers with a polyvinyl butyral (PVB) interlayer. If desired, the shielding element 22 may be tinted, colored, or patterned, such as to provide shading benefits, customization, and the like. Where a laminated glass is used, for example, the PVB interlayer may be tinted, colored, or patterned. Tempered and laminated glass sheets provide adequate strength combined with a desirable aesthetic. The shielding element 22 comprises a plurality of mounting holes 32 that are positioned to coincide with the mounting holes 28 of the rafter element or elements 21.

The dimensions of the shielding element 22 may be selected depending on the desired dimensions of the particular shelter assembly 10. In some embodiments, each shielding element 22 may have substantially the same dimensions, enhancing the modularity of the shelter assembly 10. For example, in some embodiments, each shielding element may be between about 40 and 60 inches in width and between about 70 and about 100 inches in length, alternatively between about 45 and 50 inches in width and between about 80 and 90 inches in length. Similarly, the thickness of the shielding element 22 may depend on the weather conditions of the location in which the shelter assembly 10 is to be installed. In general, however, tempered, laminated glass sheets having a thickness of less than 1 inch may typically be used as the shielding element 22.

The number of rafter elements 21 attached to a shielding element 22 will often largely depend on the width of the shielding element. Naturally, wider shielding elements 22 typically will require a greater number of rafter elements 21 for structural support. In some embodiments, the length of the rafter element 21 may also depend on the length of the shielding element 22. For instance, in some embodiments the slots 25 of the rafter elements 21 may extend at least 50% of the length of the shielding element 22, alternatively at least 60% of the length of the shielding element. In the embodiment, illustrated in FIG. 4 for example, the slots 25 of the rafter elements 21 extend between about 65% and 70% of the length of the shielding element 22, such as for example about ⅔ (66%) of the length of the shielding element. Utilizing rafter elements 21 extending along a length of the shielding element 22 in this manner provides enhanced stability to the shielding element.

Figure 4:
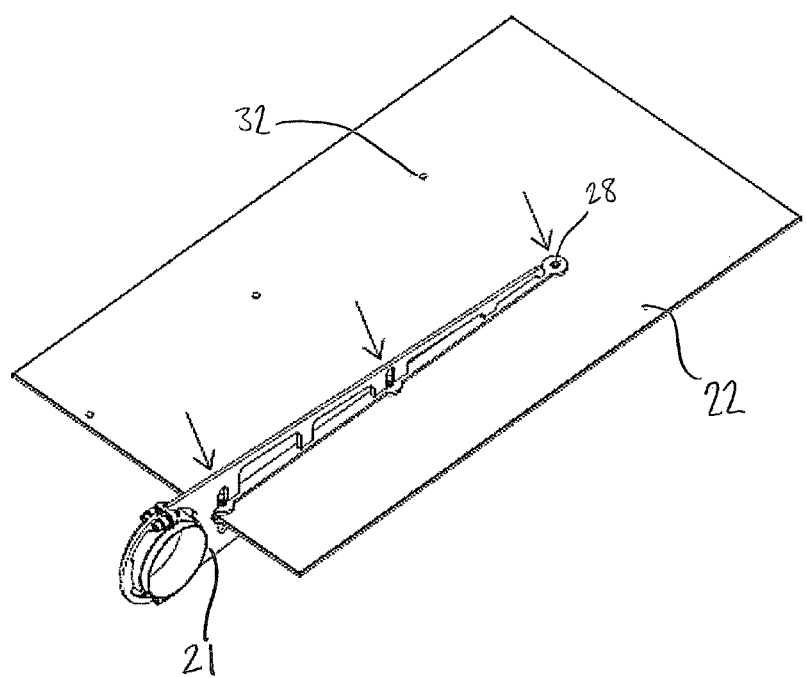
FIG. 4 is a perspective view of an embodiment of a rafter element and an embodiment of a shielding element of a roof panel, showing the securing of the shielding element in the slot of the rafter element.

The rafter elements 21 and the shielding elements 22 are configured for easy assembly of the roof panels 20. For example, the shielding element 22 may be placed on an elevated structure, such as a sawhorse or a stand, and the rafter element 21 may be maneuvered so that the shielding element is received within the slot 25. The rafter element 21 is then maneuvered so that the mounting holes 28 on the rafter element 21 are aligned with the mounting holes 32 on the shielding element 22, as is shown in FIG. 4. Once the sets of mounting holes 28, 32 are aligned, the rafter element 21 and the shielding element 22 may be secured together by inserting fasteners, such as bolts, through the mounting holes 28, 32 and securing the appropriate washers and nuts.

Prior to maneuvering the rafter element 21 onto the shielding element 22, it may be desirable to place one or more gaskets within the slot 25. For instance, an adhesive gasket may be attached to the flange 27 elements in the area immediately surrounding each of the mounting holes 28. These gaskets may prevent harm to the glass shielding element 22 during fastening. Similarly, prior to assembly of the rafter element 21 and the shielding element 22, it may be desirable to place a plastic spacer into the mounting holes 32 on the glass shielding element 22. Moreover, in some embodiments, prior to maneuvering the rafter element 21 onto the shielding element 22, a rafter assembly tool (essentially a spacer) may be inserted into the aperture 29 of the clamp 24 and the first and second clamp portions 24*a*, 24*b* of the rafter element 21 may be tightened together so that the clamp presses against the rafter assembly tool, causing the rafter body 23 to flex so as to slightly widen the slot 25.

Figure 5:
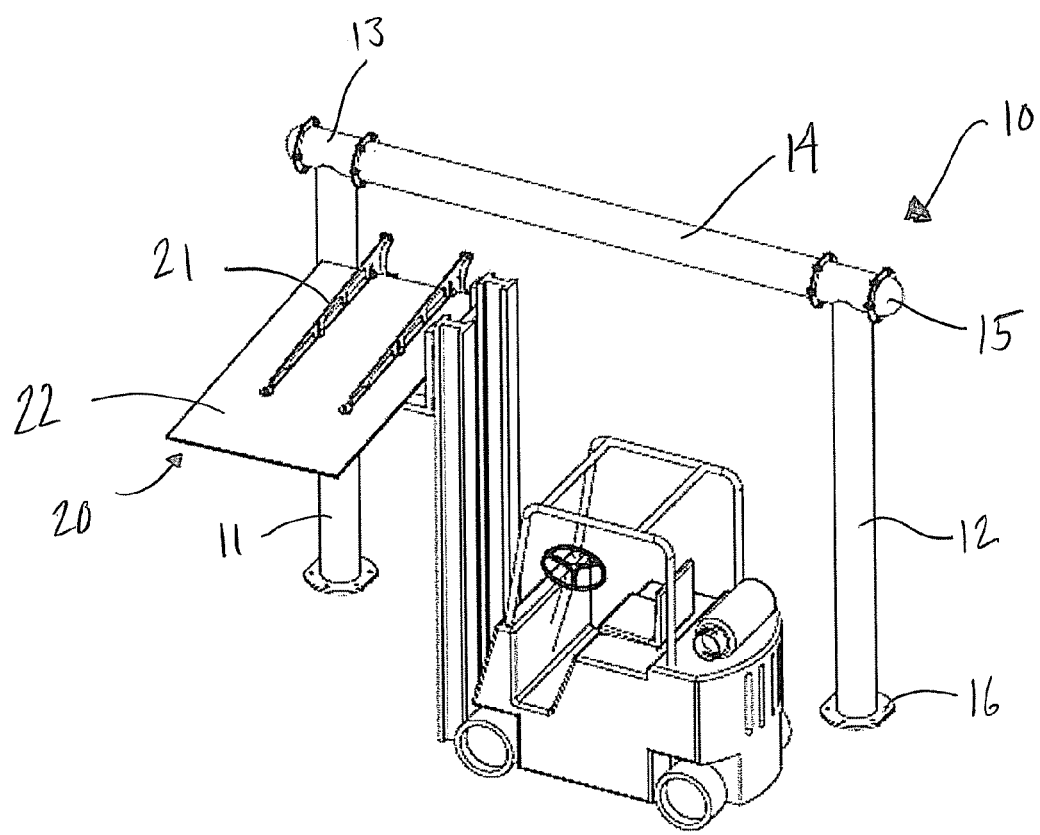
FIG. 5 is a front perspective view showing the mounting of an embodiment of a roof panel to a crossbar.
Figure 6:
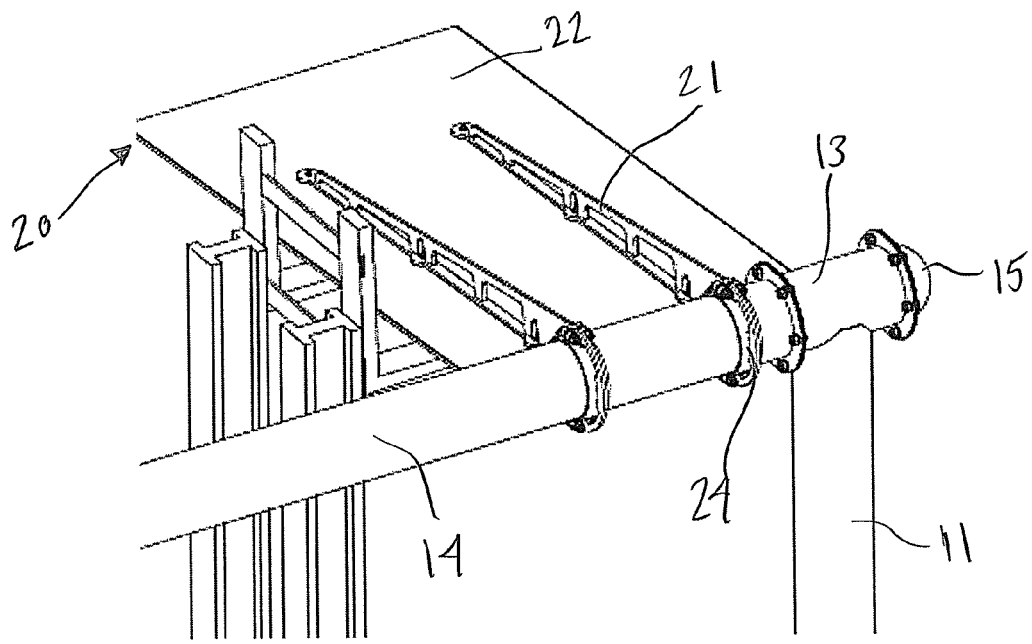
FIG. 6 is a rear perspective view showing the mounting of an embodiment of a roof panel to a crossbar.

The assembled roof panels 20 are also configured for easy mounting on the crossbar 14. For example, each roof panel 20 may be individually mounted on the crossbar 14 as shown in FIGS. 5 and 6. As shown in FIG. 5, the second (independent) clamp portion(s) 24b of the rafter element(s) 21 are removed and the roof panel 20 is raised up to the crossbar 14 by a forklift or the like. The roof panel 20 is then positioned so that the crossbar abuts the first clamp portion (s) 24a of the rafter element(s) 21 and the roof panel is at a desired angle with respect to a horizontal axis. The second clamp portion(s) 24b of the rafter element(s) are then affixed to the first clamp portion(s) 24a such that the crossbar 14 extends through the aperture 29, as shown in FIG. 6. The fasteners, e.g. bolts, connecting the first and second clamp portion(s) 24a, 24b are then tightened to secure the roof panel 20 to the crossbar 14. The rafter element(s) 21 are configured such that when the fasteners connecting the first and second clamp portions 24a, 24b are tightened, the clamp 24 securely grips the crossbar 14, maintaining the roof panel 20 at the selected angle.

If the angle of a roof panel 20 needs to be adjusted, each roof panel may be independently rotatable to a plurality of different angles by loosening the fasteners that attach the first clamp portion 24a and the second clamp portion 24b. The roof panel 20 may then be resecured to the crossbar 14 at the desired angle by tightening the fasteners that attach the first clamp portion 24a and the second clamp portion 24b.

Figure 2:
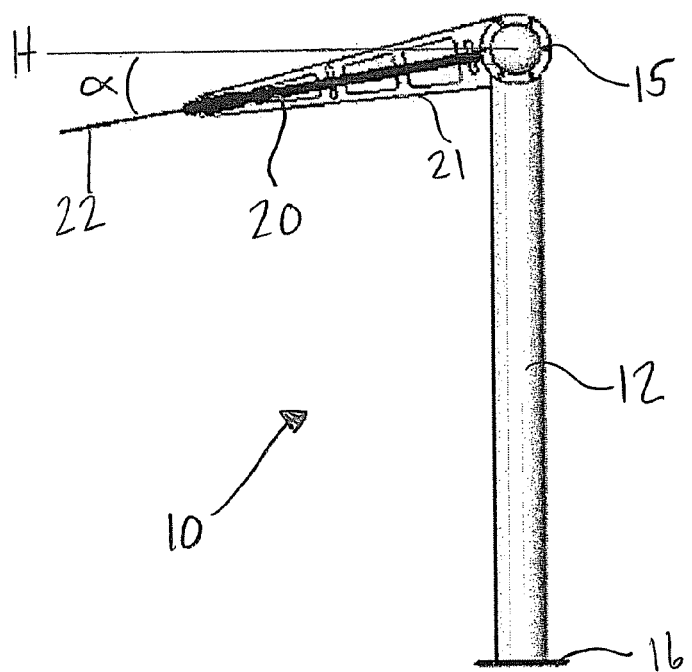
FIG. 2 is a side elevation view of the bicycle shelter assembly embodiment shown in FIG. 1.

Roof panels 20 may be mounted so as to extend from one side of the crossbar 14, such as in the embodiment shown in FIGS. 1-2, or from two opposing sides of the crossbar 14, such as in the embodiments shown in FIGS. 8-13, depending on the needs of the location of installation. Notably, a shelter assembly 10 that is originally configured to only have roof panels 20 extend in one direction from the crossbar 14 may easily be converted to a shelter assembly 10 having roof panels extending in two directions, such as to increase the capacity of the assembly, i.e. the number of bikes that can be protected by the shelter assembly.

In some embodiments, the crossbar 14 may be configured to support a desired number of roof panels 20 extending from each side of the crossbar 14. In the illustrated embodiments, for example, the crossbar 14 is configured to support three identical roof panels 20 on each side.

Figure 7:
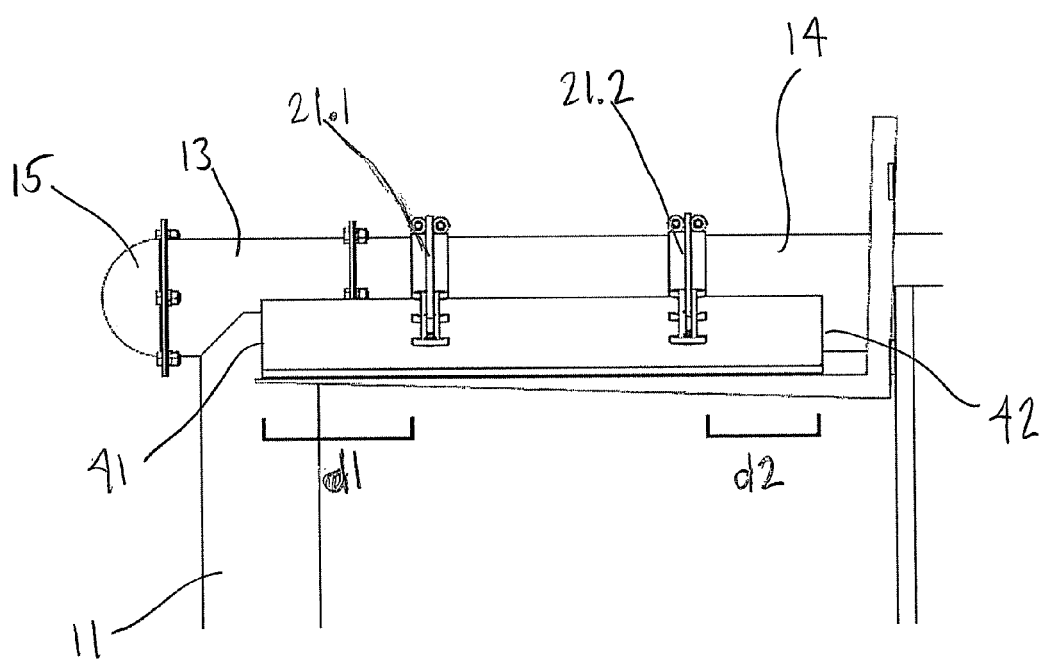
FIG. 7 is a side elevation view showing an embodiment of a roof panel that is configured to provide for the alignment of roof panels in two opposing directions.

In some embodiments, the roof panels 20 may be configured so that the panels on opposing sides of the crossbar 14 are substantially aligned. Because the clamps 24 of the rafter elements 21 for opposing roof panels may not overlap (i.e. may not be mounted at the exact same position on the crossbar), this requires that the rafter elements 21 be arranged non-symmetrically with respect to the shielding elements 22. An embodiment of such an arrangement is shown in FIG. 7. In the embodiment shown in FIG. 7, for example, a first rafter element 21.1 is located a distance d1 from a first side edge 41 of the shielding element 22. A second rafter element 21.2 is located a distance d2 from the second side edge 42 of the shielding element 22. Distance d1 is not the same as distance d2. In particular, distance d1 may be larger than distance d2. Accordingly, the d1 side of the roof panel 20 may be referred to as the long side and the d2 side of the roof panel may be referred to as the short side. In some embodiments, the difference between distance d1 and d2 may be substantially equivalent to the width of a rafter element 21, and more particularly to the width of the clamp 24 of a rafter element.

When one mounts roof panels 20 in opposing directions, the short side (d2 side) may be mounted so as to always be on either the right or the left when viewed from the free, or distal, end of the panel. For instance, in FIG. 7, the short side of the roof panel 20 is mounted to the right. Accordingly, when a second roof panel 20 (not shown) is mounted so as to extend from the opposite side of the crossbar 14, the short side of the second roof panel will aligns with the long side of the illustrated roof panel. Accordingly, the clamps 24 of the second roof panel 20 (not shown) may be mounted to the right of (and in some embodiments immediately adjacent to, such as with a gap of less than ½ inch) the clamps of the illustrated roof panel, i.e. closer to upright 11 than the illustrated clamps. The second (short) side edge 42 of the second, nonillustrated roof panel 20 may thus align with the first (long) side edge 41 of the roof panel shown in FIG. 7 and the first (long) side edge 41 of the second, nonillustrated roof panel 20 may align with the second (short) side edge 42 of the roof panel shown in FIG. 7. In this manner, the side edges 41, 42 of opposing roof panels 20 may be substantially aligned.

In some embodiments, one or more of the roof panels 20 may be positioned to angle downward, such that rainwater runs off the distal end of the panels. For instance, the plurality of roof panels may be positioned at an angle between about −1 degrees and about −25 degrees relative to a horizontal axis, alternatively between about −3 degrees and about −20 degrees, alternatively between about −5 degrees and about −15 degrees. In the embodiment shown in FIGS. 1 and 2, for example, each of the roof panels 20 is at an angle α from the horizontal axis, labeled H, wherein angle α is about −10 degrees.

Alternatively, one or more roof panels 20 may be positioned to angle upward, such that rainwater runs off the proximal end of the panel. For instance, the plurality of roof panels may be positioned at an angle between about 1 degrees and about 25 degrees relative to a horizontal axis, alternatively between about 3 degrees and about 20 degrees, alternatively between about 5 degrees and about 15 degrees. In the embodiment shown in FIGS. 11 and 12, for example, each of the roof panels 20 extending to the right of the crossbar (from the illustrated perspective) is at an angle α from the horizontal axis, labeled H, wherein angle α is about 10 degrees. In some embodiments, the assembly 10 may further comprise a gutter element (non-illustrated) that aligns with the crossbar 14 and which is configured to direct water flowing off one or more upwardly angled roof panels 20 toward the first upright 11, the second upright 12, or both.

Alternatively, one or more roof panels 20 may be positioned to be substantially horizontal, i.e. substantially aligned with the horizontal axis (a is about 0 degrees).

The ability to individually select the angle at which each roof panel 20 is mounted allows for the production of shelter assemblies 10 having a variety of configurations. A number of the possible configurations are shown in FIGS. 1, 2, 8, 9, 10, 11, 12, and 13. The shelter assembly 10 shown in FIGS. 1 and 2 comprises roof panels 20 extending from only one side of the crossbar 14. Each of the roof panels 20 is angled downward at substantially the same angle. Where adjacent roof panels 20 are angled at substantially the same angle, a T-shaped flange may be inserted into the narrow space between the adjacent panels (such that the flat upper portion of the "T" is substantially aligned with the upper surfaces of the adjacent shielding elements 22). This T-shaped flange serves to fill the gap between adjacent roof panels 20, producing a continuous span of protective coverage across the adjacent panels.

Figure 8:
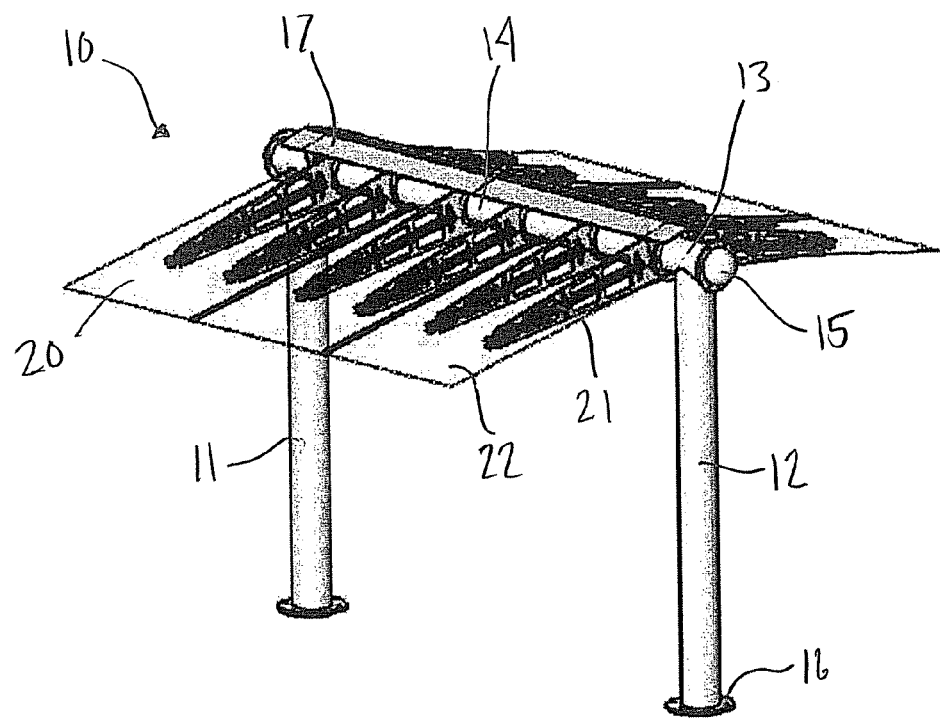
FIG. 8 is a front perspective view of an embodiment of a bicycle shelter assembly of the present disclosure.
Figure 9:
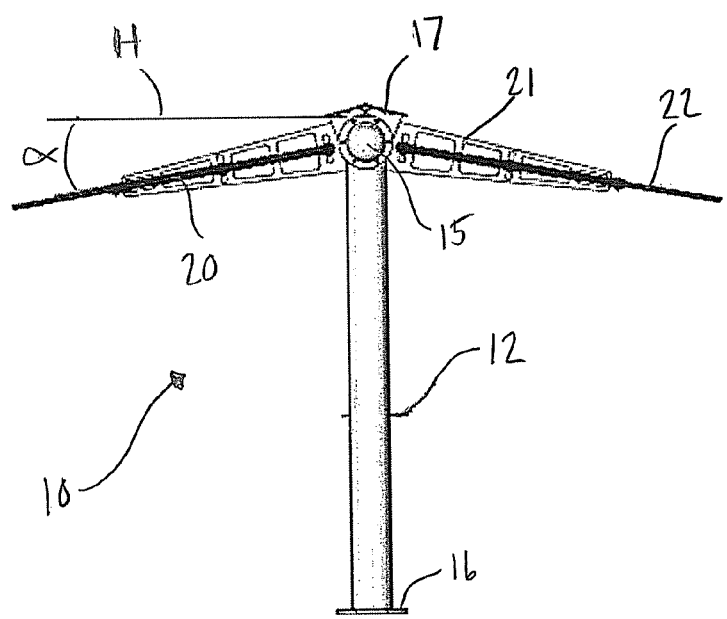
FIG. 9 is a side elevation view of the bicycle shelter assembly embodiment shown in FIG. 8.

The shelter assembly 10 shown in FIGS. 8 and 9 comprises roof panels 20 extending from opposing sides of the crossbar 14. As shown in FIG. 9, each of the roof panels 20 is angled downward at substantially the same angle. Alternatively, each of the roof panels 20 extending from a first side of the crossbar 14 may be angled at a first downward angle and each of the roof panels extending from a second side of the crossbar may be angled at a second downward angle. For instance, in some embodiments, it may be desirable to have the roof panels 20 extending from one side of the crossbar 14 angled further downward than the roof panels extending from the other side of the crossbar.

In some embodiments, the assembly 10 may also comprise a ridge cap 17 located above the crossbar 14. The ridge cap 17 serves to direct rainwater and other precipitation away from the crossbar 14 (from which it could drip into the sheltered area) and onto the roof panels 20 (where it will flow to the perimeter of the sheltered area). The ridge cap 17 may be mounted to the assembly 10 by flanges that are secured by the fasteners connecting the first and second uprights 11, 12 with the crossbar 14. For example, toward the end of the assembly process, one or more of a plurality of fasteners that connect each upright 11, 12 with the crossbar 14 can be loosened or removed, the corresponding flange portion of the ridge cap 17 can be aligned with the flanges of the upright and the crossbar, and the one or more fasteners can be reinserted and/or tightened so as to secure the ridge cap to the assembly.

Figure 10:
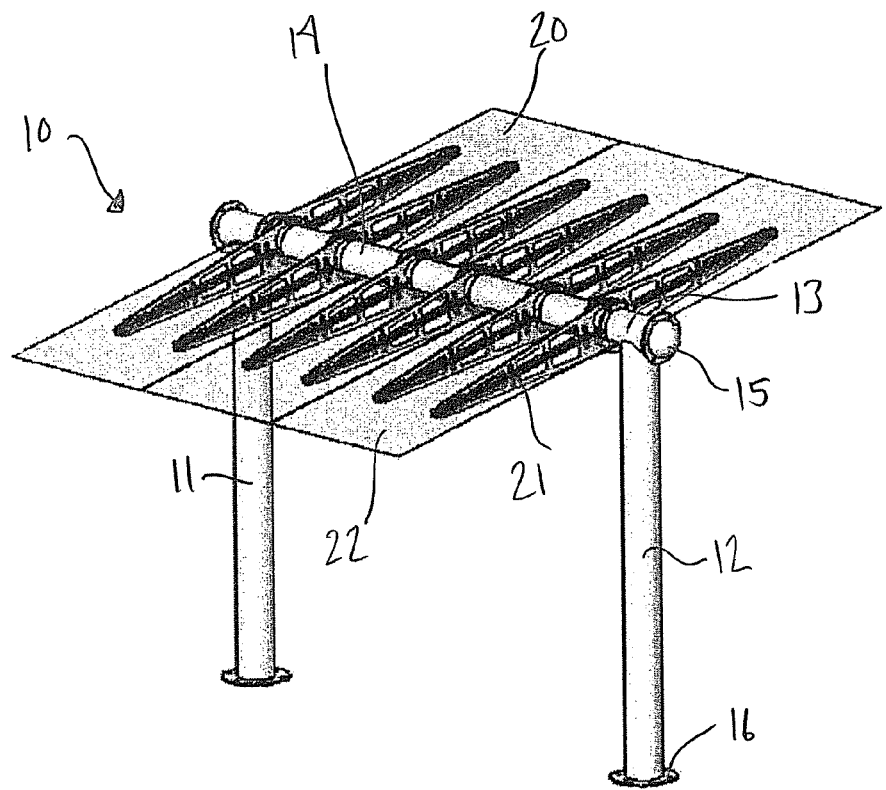
FIG. 10 is a front perspective view of an embodiment of a bicycle shelter assembly of the present disclosure.
Figure 11:
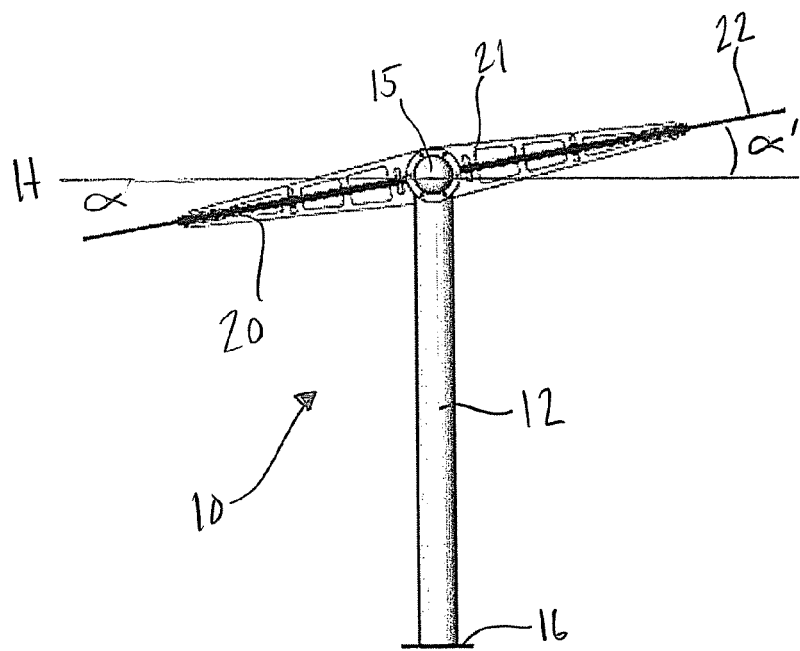
FIG. 11 is a side elevation view of the bicycle shelter assembly embodiment shown in FIG. 10.

The shelter assembly 10 shown in FIGS. 10 and 11 comprises roof panels 20 extending from opposing sides of the crossbar 14. Here, however, the roof panels 20 extending from a first side of the crossbar 14 are angled downward and the roof panels extending from a second side of the crossbar 14 are angled upward. In some embodiments, as shown in FIG. 11, each of the roof panels 20 on the first side may be angled downward at substantially the inverse angle (e.g. α is −10 degrees) that the roof panels on the second side are angled upward (e.g. α' is 10 degrees). Alternatively, each of the roof panels 20 extending from a first side of the crossbar 14 may be angled at a first downward angle α and each of the roof panels extending from a second side of the crossbar may be angled at a second upward angle α', wherein the degree of the angles α and α' differ.

In embodiments such as that shown in FIGS. 10 and 11, rainwater contacting all of the roof panels 20 may be directed in a single general direction. This configuration may be particularly desirable where the side of the shelter assembly 10 having the larger opening, i.e. the side having the upward angled roof panels 20, is otherwise partially shielded from the elements, such as by a building or other existing structure. Additionally, two shelter assemblies 10 having this configuration may be assembled back-to-back so that the distal ends of the upward-angled roof panels 20 are substantially aligned at the center of the combined structure, thereby creating a double-sized shelter. The narrow gaps between the distal ends of the adjacent roof panels can also be filled by a substantially leak-proof T-shaped flange similar to that used on side-by-side panels as described above. Any gap between the proximal ends of the roof panels 20 and the crossbar 14 may similarly be filled by one or more substantially leak-proof flange elements, and/or, as previously described, a gutter element may be added to direct water toward one or more of the uprights 11, 12.

Figure 12:
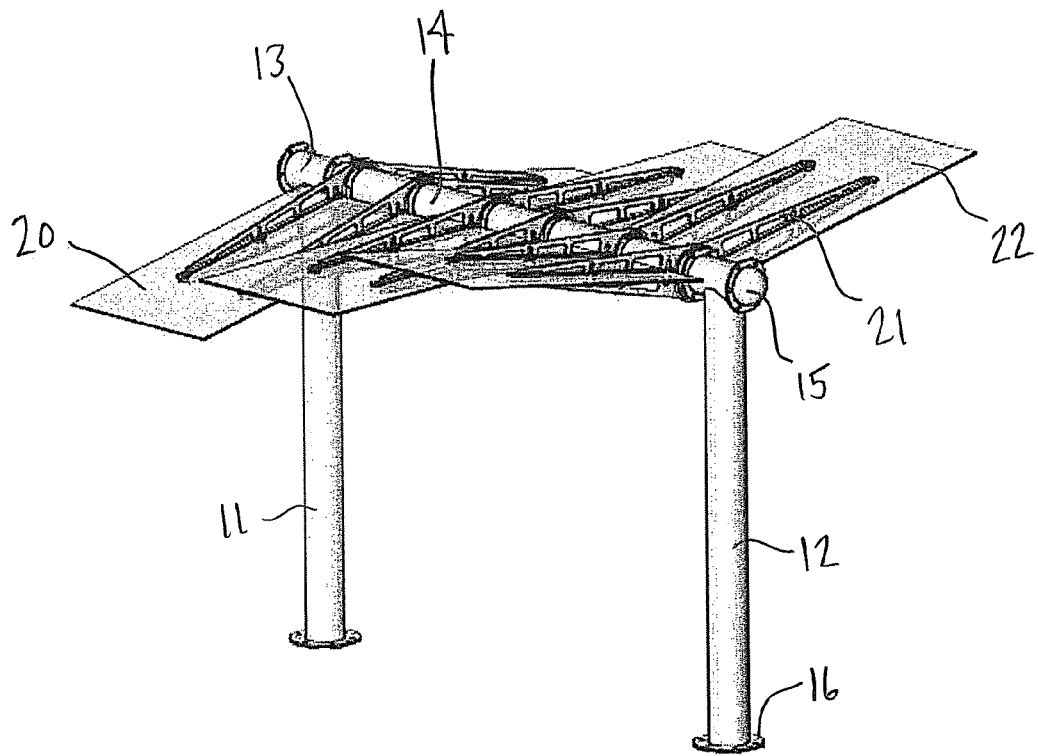
FIG. 12 is a front perspective view of an embodiment of a bicycle shelter assembly of the present disclosure.
Figure 13:
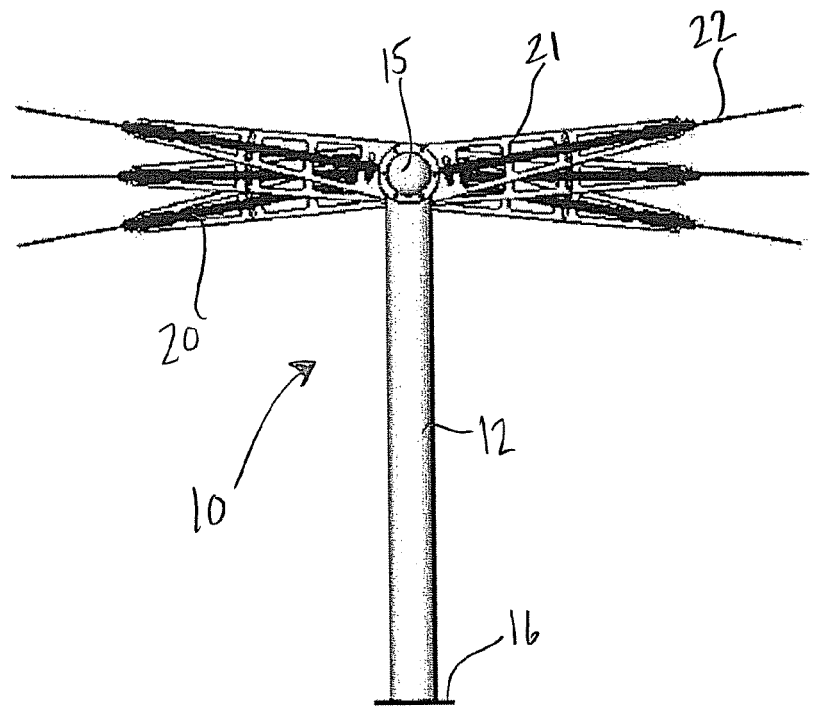
FIG. 13 is a side elevation view of the bicycle shelter assembly embodiment shown in FIG. 12.

The shelter assembly 10 shown in FIGS. 12 and 13 also comprises roof panels 20 extending from opposing sides of the crossbar 14. Here, the set of roof panels 20 extending from each side of the crossbar comprises one or more roof panels 20 angled downward, one or more roof panels angled upward, and one or more roof panels that are substantially horizontal. By alternating between differently angled roof panels 20, any number of wave-like or other interesting and aesthetically pleasing configurations can be produced.

Figure 14:
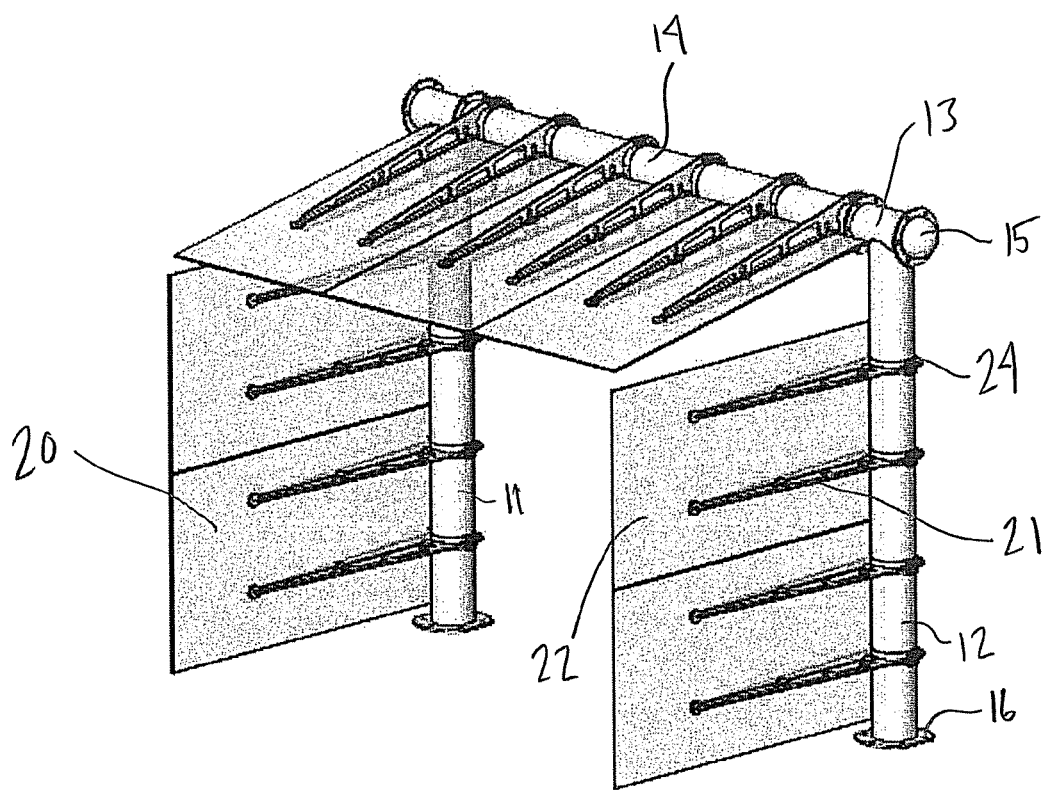
FIG. 14 is a front perspective view of an embodiment of a bicycle shelter assembly of the present disclosure.
Figure 15:
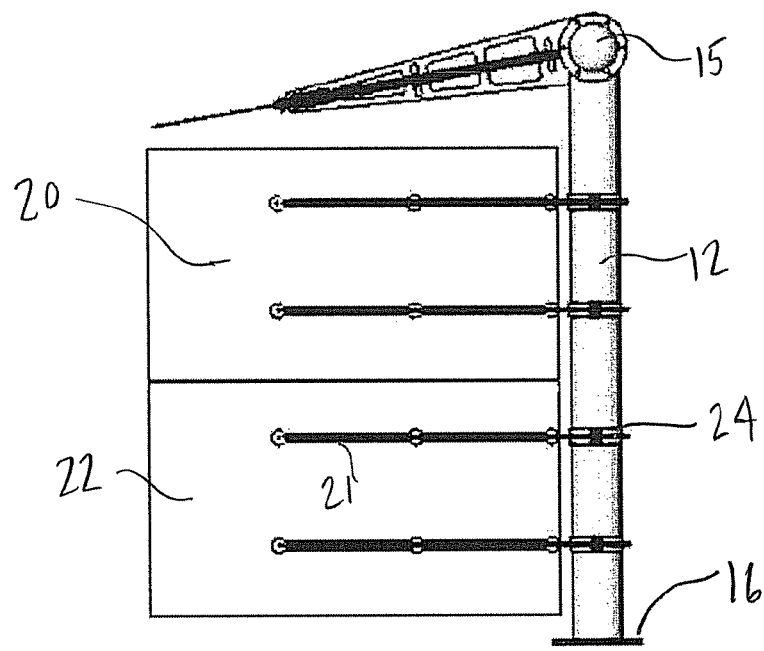
FIG. 15 is a side elevation view of the bicycle shelter assembly embodiment shown in FIG. 14.

In some embodiments, the roof panels 20 may also be configured to be secured to the first upright 11 and/or the second upright 12. Such an embodiment is shown in FIGS. 14 and 15. By including roof panels 20 along the first upright 11 and/or the second upright 12, one may provide additional protection against the elements, which may be particularly desirable where the shelter assembly 10 is to be installed in a location with particularly harsh conditions such as high winds. As shown in the illustrated embodiment, the roof panels 20 secured to the first and second uprights 11, 12 may extend in substantially the same direction as the roof panels 20 extending from the crossbar 14. Although the illustrated embodiment shows roof panels 20 extending in a single direction from the crossbar 14 and from the first and second uprights 11, 12, in other embodiments, roof panels may extend from the first and second uprights in two opposing directions in the same way that roof panels may extend from the crossbar in two opposing directions.

In yet other embodiments, which are not illustrated, the roof panels 20 secured to the first and second uprights 11, 12 may extend in a direction generally toward the opposing upright, so as to form a partial or complete rear wall (in embodiments where roof panels extend from only one side of the crossbar 14) or a partial or complete central dividing wall (in embodiments where roof panels extend from both sides of the crossbar). Additionally, although the illustrated embodiment shows two roof panels 20 secured to each of the first and second uprights 11, 12, in some embodiments, it may be desirable to have more than two (e.g. depending on the height of the uprights and the width of the roof panels) or to only have one roof panel 20 extending from the first and/or second uprights.

Figure 16:
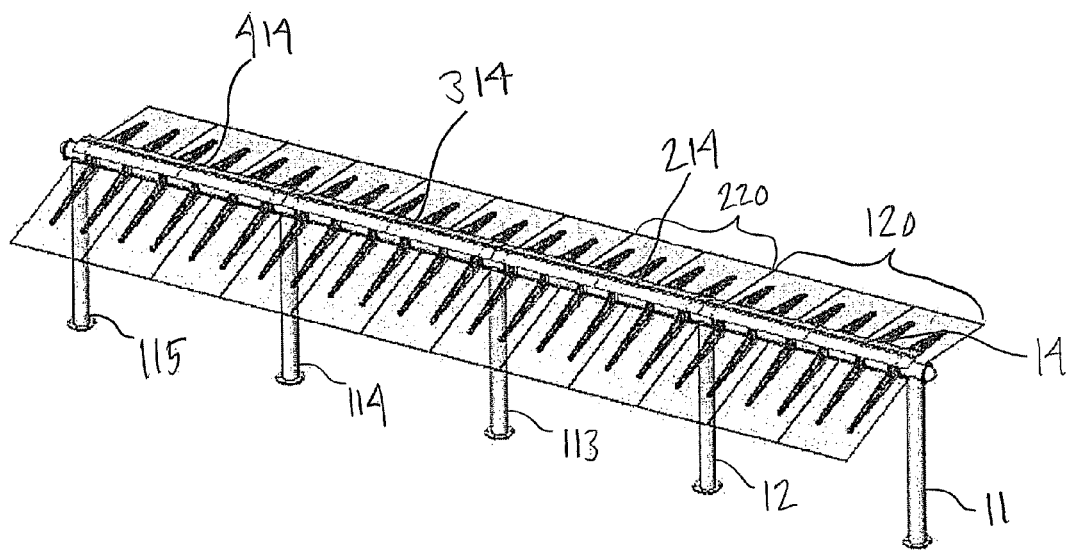
FIG. 16 is a perspective view of an embodiment of a bicycle shelter assembly of the present disclosure, showing a plurality of modular shelter assemblies connected in series.

In some embodiments, the shelter assembly 10 may be configured to be modular. For instance, in some embodiments, each of the first and second uprights 11, 12 may comprises a T-joint 13, each side of the T-joint 13 being configured to attach to a crossbar 14. Thus, a single upright 11, 12 may be used to support two crossbars 14. In some embodiments, for instance, the shelter assembly may comprise a third upright 113, a second crossbar 214 bridging between the second upright 12 and the third upright 113, and a plurality of roof panels 20 secured to the second crossbar 214. The embodiment illustrated in FIG. 16, for example, comprises a third upright 113, a fourth upright 114 and a fifth upright 115. A second crossbar 214 spans between the second upright 12 and the third upright 113. A third crossbar 314 spans between the third upright 113 and the fourth upright 114. And a fourth crossbar 414 spans between the fourth upright 114 and the fifth upright 115.

Moreover, where each shelter assembly 10 is configured so that the side edges of a set of roof panels 20 substantially aligns with the central axes of the first and second uprights 11, 12, for instance, the gap between the sets of roof panels 120, 220 extending from adjacent crossbars 14, 214 may be narrow. Therefore, as with adjacent roof panels 20 extending from the same crossbar 14, the gap between a first set of roof panels 120 and a second set of roof panels 220 may be filled by a T-shaped flange or the like to produce a substantially continuous span of protective coverage.

By providing modular uprights, crossbars, and roof panels, embodiments of the present disclosure provide shelter assemblies 10 that may be assembled using fewer components. Moreover, the components may be substantially identical, which both reduces manufacturing costs and enhances, i.e. simplifies, the assembly process.

Figure 17:
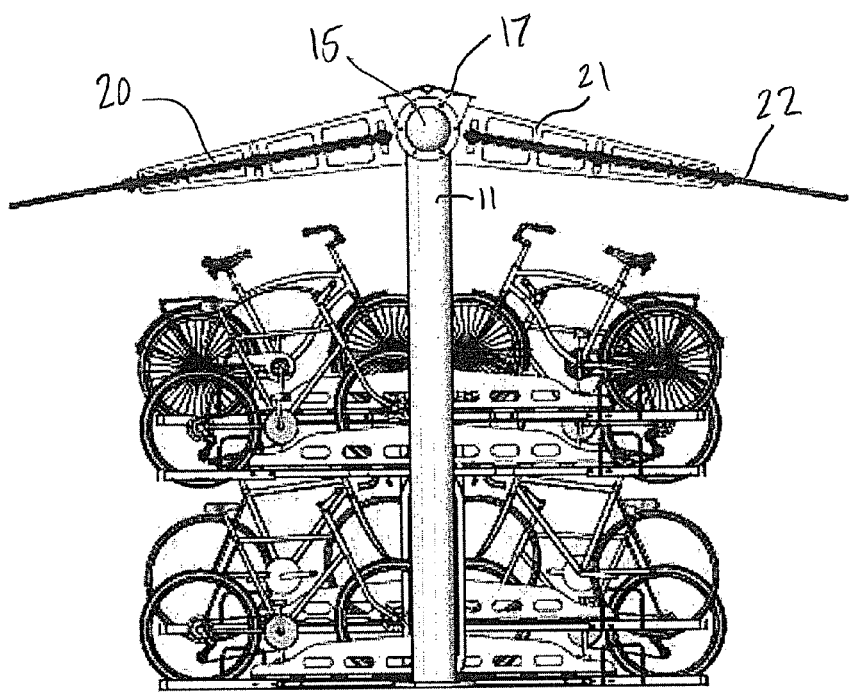
FIG. 17 is a side elevation view of an embodiment of a bicycle shelter assembly of the present disclosure, including a double-decker bicycle parking structure.
Figure 18:
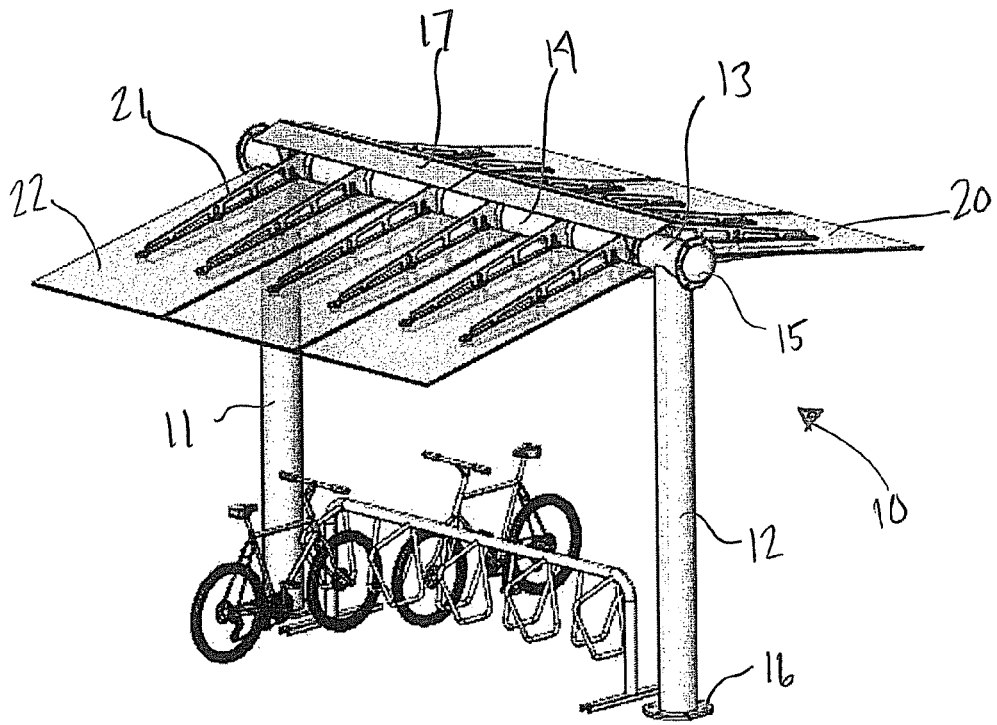
FIG. 18 is a front perspective view of an embodiment of a bicycle shelter assembly of the present disclosure, including a bicycle rack.
Figure 19:
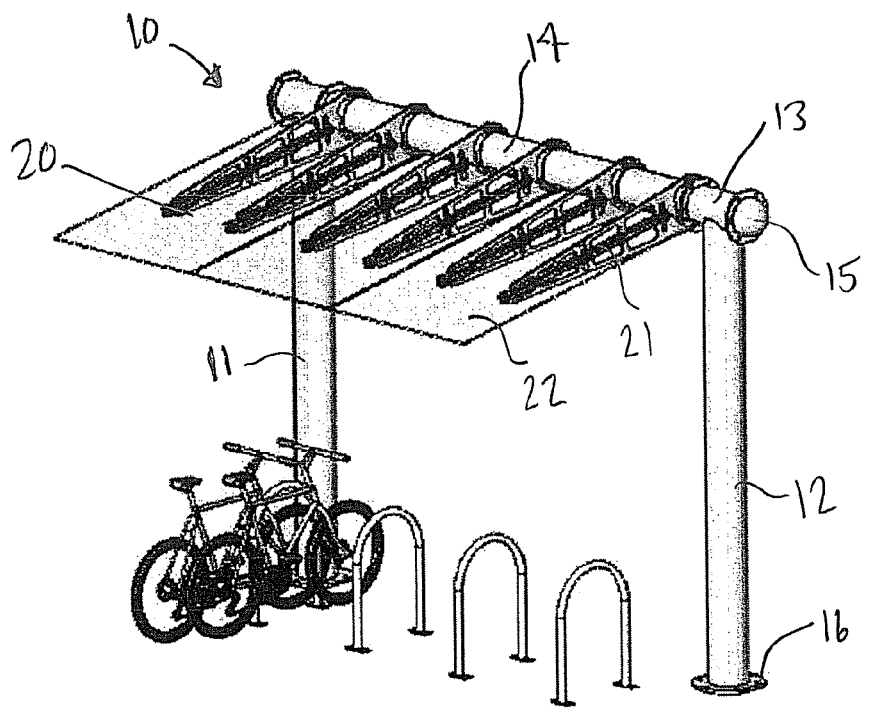
FIG. 19 is a front perspective view of an embodiment of a bicycle shelter assembly of the present disclosure, including a series of individual bicycle parking structures.

The shelter assemblies 10 disclosed herein may be configured for use with various bicycle parking and docking devices. Non-limiting examples of various bicycle parking and docking devices that may be utilized in combination with the shelter assemblies 10 disclosed herein are shown in FIGS. 17-19. In some embodiments, a bicycle parking or docking device, such as that shown in FIG. 18 for example, may be attached to the first and second uprights 11, 12.

Although the shelter assembly 10 is described in terms of providing shelter for bicycles and bicycle racks, embodiments of the shelter assembly 10 can also be used to provide shelter for any number of outdoor installations that benefit from protection against the elements, e.g. motorized vehicle parking, outdoor depositories such as post boxes and drop boxes, ATMs, transportation depots such as bus stations, train stations, taxis stands, and the like.

It can be seen that the described embodiments provide a unique and novel shelter assembly 10 that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A shelter assembly comprising:
   a. first and second uprights;
   b. a crossbar bridging the first and second uprights;
   c. a plurality of roof panels secured to the crossbar, each roof panel comprising one or more rafter elements and a shielding element;
   each rafter element comprising a body and a clamp,
      the body comprising an upper body portion and a lower body portion separated along a length of the body by a slot, the slot being configured to receive the shielding element;
      the clamp comprising a first portion integral with the body and a second portion, the second portion being attached to the first portion to form an aperture configured to accept the crossbar;
   each shielding element being secured within the slots of the one or more rafter elements by a plurality of fasteners; and
   wherein each roof panel is independently rotatable to a plurality of different angles by loosening one or more fasteners that attach the first portion and the second portion of the clamp, and each roof panel is securable to the crossbar at a desired angle by tightening the one or more fasteners that attach the first portion and the second portion of the clamp.

2. The shelter assembly of claim 1, wherein each roof panel comprises two rafter elements.

3. The shelter assembly of claim 1, wherein the shielding element is a sheet of glass.

4. The shelter assembly of claim 1, wherein the roof panels are also configured to be secured to the first upright and the second upright.

5. The shelter assembly of claim 4, further comprising one or more roof panels secured to the first upright, the second upright, or a combination thereof.

6. The shelter assembly of claim 5, further comprising one or more roof panels secured to the first upright and one or more roof panels secured to the second upright, the roof panels secured to the first and second uprights extending in the same direction as at least some of the plurality of roof panels secured to the crossbar.

7. The shelter assembly of claim 1, wherein the plurality of roof panels are positioned at angles between about 20 degrees and about −20 degrees relative to horizontal.

8. The shelter assembly of claim 1, wherein the plurality of roof panels extend from only one side of the crossbar.

9. The shelter assembly of claim 1, wherein the plurality of roof panels extend from two sides of the crossbar.

10. The shelter assembly of claim 9, wherein the plurality of roof panels are positioned at substantially the same angle relative to horizontal.

11. The shelter assembly of claim 9, wherein
    the plurality of roof panels extending from one side of the crossbar are positioned at an angle between about 1 degree and about 20 degrees relative to horizontal, and
    the plurality of roof panels extending from the other side of the crossbar are positioned at an angle between about −1 degree and about −20 degrees relative to horizontal.

12. The shelter assembly of claim 1, wherein the plurality of roof panels comprises a set of roof panels extending from one side of the crossbar, the set of roof panels comprising at least a first roof panel positioned at an angle between about 1 degree and about 20 degrees relative to horizontal and a second roof panel positioned at an angle between about −1 degree and about −20 degrees relative to horizontal.

13. The shelter assembly of claim 1, wherein each of the first and second uprights comprises a T-joint at an upper end, each side of the T-joint being configured to attach to a crossbar.

14. The shelter assembly of claim 13, further comprising an end cap covering at least one side of the T-joint.

15. The shelter assembly of claim 1, further comprising
    a. a third upright;
    b. a second crossbar bridging the second upright and the third upright;
    c. a plurality of roof panels secured to the second crossbar, each roof panel comprising one or more rafter elements and a shielding element;
    each rafter element comprising a body and a clamp,
       the body comprising an upper body portion and a lower body portion separated along a length of the body by a slot, the slot being configured to receive the shielding element;
       the clamp comprising a first portion integral with the body and a second portion, the second portion being attached to the first portion to form an aperture configured to accept the crossbar;
    each shielding element being secured within the slots of the one or more rafter elements by a plurality of fasteners; and
    wherein each roof panel is independently rotatable to a plurality of different angles by loosening one or more fasteners that attach the first portion and the second portion of the clamp, and each roof panel is securable to the crossbar at a desired angle by tightening the one or more fasteners that attach the first portion and the second portion of the clamp.

16. The shelter assembly of claim 1, wherein the slots of the one or more rafter elements extend at least 50% of the length of the shielding element.

17. The shelter assembly of claim 16, wherein the slots of the one or more rafter elements extend about 66% of the length of the shielding element.

18. The shelter assembly of claim 1, wherein a first set of three roof panels extend from a first side of the crossbar and the first set of roof panels span substantially the length of the crossbar.

19. The shelter assembly of claim 18, wherein a second set of three roof panels extend from a second side of the crossbar and the second set of roof panels span substantially the length of the crossbar, and wherein the first set of roof panels and the second set of roof panels are substantially aligned.

20. The shelter assembly of claim 1, further comprising at least one bicycle parking structure or bicycle rack positioned underneath the plurality of roof panels.

\* \* \* \* \*